United States Patent [19]

Jacobs

[11] Patent Number: 4,836,976
[45] Date of Patent: Jun. 6, 1989

[54] LIGHT WATER REACTOR CORES WITH INCREASED RESISTANCE TO STRESS CORROSION CRACKING

[75] Inventor: Alvin J. Jacobs, San Jose, Calif.
[73] Assignee: General Electric Company, San Jose, Calif.
[21] Appl. No.: 40,017
[22] Filed: Apr. 20, 1987
[51] Int. Cl.4 .............................. G21C 9/00
[52] U.S. Cl. ........................ 376/305; 420/43
[58] Field of Search ................ 376/305; 420/43
[56] References Cited

U.S. PATENT DOCUMENTS 3,486,885 12/1969 Armijo .................................. 420/43
4,162,930 7/1979 Abe et al. ............................ 420/43

FOREIGN PATENT DOCUMENTS 0027962 2/1983 Japan ..................................... 420/43

Primary Examiner—Charles T. Jordan
Assistant Examiner—Richard W. Wendtland
Attorney, Agent, or Firm—Robert R. Schroeder

[57] ABSTRACT

Irradiation assisted stress corrosion cracking occurring in the metallic core components of light water nuclear reactors is reduced by the use of austenitic stainless steel alloys containing a maximum of about 0.03% nitrogen, as well as about 0.025% to about 0.067% carbon, about 1.5% to about 2.0% manganese, a maximum of about 0.005% phosphorus, a maximum of about 0.05% silicon, and a maximum of about 0.005% sulfur.

10 Claims, No Drawings

LIGHT WATER REACTOR CORES WITH INCREASED RESISTANCE TO STRESS CORROSION CRACKING

BACKGROUND AND SUMMARY OF INVENTION

This invention relates to the core construction of light water nuclear reactors, and particularly to methods for minimizing the stress corrosion cracking that occurs in the metallic structural elements of the core.

While intergranular stress corrosion cracking (IGSCC) in stainless steel can be controlled or minimized in a variety of ways, the austenitic stainless steel components of light water nuclear reactors suffer a heightened susceptibility as the result of the long term irradiation which such components are subjected to in service. For example, while stainless steels in the solution or mill-annealed conditions are immune to intergranular stress corrosion cracking outside of the core, such immunity is lacking in the same materials when placed in the high irradiation field encountered inside the core.

It has been postulated that the irradiation occurring in the core exposes the alloys to IGSCC by promoting the segregation of impurities, namely phosphorus, silicon and sulfur, to the grain boundaries. Accordingly, the industry has sought to minimize this irradiation-assisted stress corrosion cracking (IASCC) by using stainless steel which is high purity in terms of these impurities. Thus, modified forms of such alloys as 348 and 304 stainless steel (using the official classification system of the American Society of Testing and Materials) in which the upper limits on each of these three elements have been lowered from the standard have been used.

These high purity grades have indeed prolonged the life of the core components, but have not completely eliminated the IASCC problem. The results have instead varied, demonstrating a lack of consistency in the alloy behavior under the irradiation conditions.

It has now been discovered that the inconsistency is virtually eliminated and an even further reduction in susceptibility to IASCC is achieved by controlling the nitrogen content of austenitic stainless steels to a maximum of 0.05 weight percent, preferably to a maximum of 0.03 weight percent. The lowered nitrogen content is combined with the other features of the alloy known to inhibit stress corrosion cracking, with the result that metallic parts of unusually long life in a nuclear reactor are achieved.

DETAILED DESCRIPTION OF THE INVENTION AND PREFERRED EMBODIMENTS

The stainless steels to which the present invention are addressed are austenitic stainless steels, which are favored over other type for their resistance to stress corrosion cracking. To maintain the stainless steel in its austenitic state as well as the strength of this steel, carbon is included as an alloying component in view of its known ability to inhibit conversion of the austenitic structure to the martensitic structure. Accordingly, carbon is present at a minimum level of about 0.025%. All percents in this specification are on a weight basis.

The present invention finds applicability in stabilized and unstabilized stainless steels, the stabilized alloys being characterized by the inclusion of titanium, preferably within the range of about 0.1 to about 0.3%, and/or niobium, preferably in a range of about 0.25%, to about 0.6%. Examples of stabilized steels include types 321, 347 and 348. For stabilized steels, the carbon content in the practice of the present invention will range from about 0.025% to about 0.06%. For unstabilized stainless steels, examples of which are the 304 and 316 types, the carbon content will range from about 0.025% to bout 0.04%. Unstabilized stainless steels are those which are substantially devoid of titanium and niobium, or at best contain amounts below the ranges stated above.

Further included as an austenite stabilizer is manganese. Whle manganese is a commonn alloying element in austenitic stainless steels of the 300 series, it is normally specified only by the imposition of a maximum of 2%. In the context of the present invention, however, a lower limit of 1.5% is also imposed on the manganese.

The types referred to above, i.e., 304, 316, 321, 347 and 348, refer to high purity modifications of the standard alloys under these designations, in terms of the phosphorus, silicon and sulfur contents. Thus, the phosphorus content will be a maximum of about 0.005%, the silicon a maximum of about 0.05% and the sulfur a maximum of about 0.005% in these modified alloys.

The remaining alloying elements of the stainless steel alloys of the present invention are chromium and nickel. The ranges of these elements are typical of those encountered in 300 series stainless steels. Chromium, for example, will generally fall within the range of about 15% to about 30%, preferably from about 15% to about 20%. Nickel likewise will generally fall within the range of about 5% to about 15%, preferably from about 8% to about 13%.

The present invention is applicable to light water nuclear reactors in general, including both pressurized water reactors and boiling water reactors. The invention finds utility in the materials of construction for the core components of such reactors, including for example one or more of the fuel and absorber rod cladding and neutron source holders.

The following examples are offered for purposes of illustration, and are intended neither to define nor limit the invention in any manner.

EXAMPLES

Accelerated irradiation and stress corrosion tests were performed on six different stainless steel alloys as follows:

TABLE 1

| | CHEMICAL COMPOSITIONS OF TEST SPECIMENS (wt %) | | | | | | | | |
|---|---|---|---|---|---|---|---|---|---|
| Material | C | Si | Mn | P | S | Ni | Cr | Mo | N |
| 304 | 0.067 | 0.52 | 1.67 | 0.021 | 0.003 | 9.60 | 18.70 | — | 0.019 |
| 304L | 0.020 | 0.47 | 1.54 | 0.024 | 0.005 | 11.55 | 18.20 | — | 0.024 |
| 316L | 0.024 | 0.50 | 1.45 | 0.028 | 0.006 | 13.60 | 16.30 | 2.66 | 0.025 |
| H.P. 316L | 0.009 | 0.04 | 1.57 | 0.007 | 0.004 | 13.61 | 16.52 | 2.53 | 0.0087 |
| 316NG | 0.014 | 0.45 | 1.63 | 0.024 | 0.004 | 13.10 | 17.00 | 2.46 | 0.097 |

TABLE 1-continued

CHEMICAL COMPOSITIONS OF TEST SPECIMENS
(wt %)

| Material | C | Si | Mn | P | S | Ni | Cr | Mo | N |
|---|---|---|---|---|---|---|---|---|---|
| H.P. 316NG | 0.010 | 0.06 | 1.55 | 0.008 | 0.003 | 13.15 | 16.71 | 2.48 | 0.095 |

All were solution heat treated at 1050° C. for 30 minutes prior to the test, and some 316 NG specimens were 20% cold worked in addition.

Irradiation was performed at the Advanced Test Reactor in Idaho Falls, Idaho. The reactor uses a high power density (1.0 megawatt per liter of core) in an efficient arrangement of fuel and loops with a combination of control drums and neck shim rods to adjust power and minimize distortion. The result is a high degree of control over the neutron flux at the various loop positions. The test spaces in the reactor consist of nine loops, eight of which are pressurized water loops through which water circulates at pressures up to 2200 psig. The ninth loop is used for increased temperature (up to 680° F.) and pressure (up to 3400 psig). The specimens were irradiated in capsules placed in vertical holes in the neck shim housing, arranged for fluences at two nominal levels—a low fluence of $8 \times 10^{20}$ n/cm$^2$ and a high fluence of $2.5 \times 10^{21}$ n/cm$^2$.

The irradiation temperature was maintained at 550° F. with an allowable operating range of 500°–625° F. The low fluence capsules were irradiated for 47.3 effective full power days, with accumulated average fast neutron fluences ranging from $8.13 \times 10^{20}$ n/cm$^2$ to $8.32 \times 10^{20}$ n/cm$^2$ depending on location in the reactor. The high fluence capsules were irradiated for 140.4 effective full power days, resulting in accumulated average fast neutron fluences ranging from $1.73 \times 10^{21}$ n/cm$^2$ to $2.37 \times 10^{21}$ n/cm$^2$, depending on location.

Stress corrosion cracking tests were then conducted on the irradiated specimens in a constant extension rate tensile (CERT) test facility at the General Electric Company Vallecitos Nuclear Center in Pleasanton, California. The tests were conducted in high purity (0.1 μS/cm) water at 550° F. containing either 32 ppm or 0.2 ppm dissolved oxygen at a system pressure of 1200 psig. All tests were conducted at an extension rate of 1 mil/hour except for the test on the low fluence-irradiated 316L specimens which was conducted at 0.5 mil/hour. The difference is not significant in terms of the test results.

The percent intergranular stress corrosion cracking observable at the end of the test for each specimen is shown in Tables 2 and 3.

TABLE 2

CERT TEST RESULTS ON LOW FLUENCE SAMPLES
($8.13$–$8.32 \times 10^{20}$ n/cm$^2$)

| Sample | TTF (hours) | Maximum Stress (Ksi) | Elongation (%) | % IGSCC (32 ppm dissolved O$_2$) |
|---|---|---|---|---|
| 304 | 255 | 75.3 | 27.2 | 0 |
| 304L | 242 | 64.9 | 25.8 | 8 |
| 316L | 692 | 68.0 | 36.8 | 0 |
| H.P. 316L | 288 | 53.8 | 30.7 | 0 |
| 316NG | 374 | 66.4 | 37.9 | 2 |
| H.P. 316NG | 217 | 57.6 | 22.4 | 50 |

TTF: Time to failure
IGSCC: Intergranular stress corrosion cracking

TABLE 3

CERT TEST RESULTS ON HIGH FLUENCE SAMPLES
$1.92$–$2.36 \times 10^{21}$ N/CM$^2$

| Sample | TTF (hours) | Maximum Stress (Ksi) | Elongation (%) | Dissolved O$_2$: | % IGSCC 32 ppm | % IGSCC 0.2 ppm |
|---|---|---|---|---|---|---|
| 304 | 78 | 79.0 | 8.3 | | 35 | |
| 316L | 124 | 68.7 | 12.0 | | 35 | |
|  | 195 | 77.4 | 24.1 | | | 0 |
| H.P. 316L | 49 | 34.2 | 5.2 | | 65 | |
|  | 123 | 72.3 | 13.8 | | | 0 |
| 316NG | 88 | 72.5 | 8.8 | | 50 | |
|  | 165 | 80.4 | 19.8 | | | 7 |
| 316NG(CW) | 89 | 112.0 | 9.5 | | 35 | |
|  | 82 | 115.1 | 9.5 | | | 7 |
| H.P. 316NG | 68 | 69.8 | 7.2 | | 55 | |
|  | 60 | 76.3 | 6.9 | | | 20 |

TTF: Time to failure
IGSCC: Intergranular stress corrosion cracking
CW: Cold worked The data in these tables show that three of the six low-fluence specimens tested showed IGSCC (Table 2), and that of these three, two were the ones containing high nitrogen levels (316NG and HP316NG). Thus, the two alloys containing high nitrogen levels were among the first to reach their irradiation assisted SCC (IASCC) threshold. Low impurity levels together with high nitrogen rendered the HP316NG the most susceptible to IASCC. The third specimen showing IGSCC (304L) contained extra low (0.020 wt %) carbon compared to 304 which did not show any IGSCC at the low fluence level.

In the high-fluence specimens, all six tested showed at least 35% IGSCC in oxygenated (32 ppm) water (Table 3). The HP316L showed the highest level, the HP316NG second and the 316NG third, the latter two being the high nitrogen specimens. This indicates that nitrogen continues to exert a significant influence on the susceptibility to IASCC even at the higher fluence level.

When the dissolved oxygen was reduced to 0.2 ppm in the tests on the high fluence specimens (Table 3), IGSCC was eliminated in the 316L and HP316L specimens. In the 316NG, 316NG(CW) and HP316NG specimens (the high nitrogen specimens), IGSCC was reduced but not completely eliminated.

The foregoing is offered primarily for purposes of illustration. It will be readily apparent to those skilled in the art that modifications and variations from the features of structure and operation disclosed herein may be introduced without departing from the spirit and scope of the invention.

What is claimed is:

1. A method for reducing the occurrence of irradiation-assisted stress corrosion cracking in the structural components of the core of a light water nuclear reactor, said method comprising forming said structural components from an austenitic stainless steel containing a maximum of about 0.05% N, a maximum of about 0.005% P, a maximum of about 0.05% Si and a maximum of about 0.005% S.

2. A method in accordance with claim 1 in which said austenitic stainless steel contains a maximum of about 0.03% N.

3. A method in accordance with claim 1 in which said austenitic stainless steel further contains from about 0.025% to about 0.06% C.

4. A method in accordance with claim 1 in which said austenitic stainless steel further contains from about 1.5% to about 2.0% Mn.

5. A method in accordance with claim 1 in which said austenitic stainless steel further contains from about 15% to about 30% Cr and from about 5% to about 15% Ni.

6. A method in accordance with claim 1 in which said austenitic stainless steel further contains from about 15% to about 20% Cr and from about 8% to about 13% Ni.

7. A method in accordance with claim 1 in which said austenitic stainless steel further contains from about 0.025% to about 0.06% C and at least one member selected from the group consisting of Ti at from about 0.1% to about 0.3% and Nb at from about 0.25% to about 0.6%.

8. A method in accordance with claim 1 in which said austenitic stainless steel further contains from about 0.025% to about 0.04% C and is substantially devoid of Ti and Nb.

9. A method for reducing the occurrence of irradiation-assisted stress corrosion cracking in the structural components of the core of a light water nuclear reactor, said method comprising forming said structural components from an austenitic stainless steel containing a maximum of about 0.03% N, from about 0.025% to about 0.04% C, a maximum of about 0.005% P, a maximum of about 0.05% Si and a maximum of about 0.005% S.

10. A method for reducing the occurrence of irradiation-asisted stress corrosion cracking in the structural components of the core of a light water nuclear reactor, said method comprising forming said structural components from an austenitic stainless steel containing a maximum of about 0.03% N, from about 0.025% to about 0.06% C, a maximum of about 0.005% P, a maximum of about 0.05% Si, a maximum of about 0.005% S, and a member selected from the group consisting of Ti at from about 0.1% to about 0.3% and Nb at from about 0.25% to about 0.6%.

* * * * *